F. W. LANCHESTER.
BALANCING MEANS FOR RECIPROCATING ENGINES.
APPLICATION FILED OCT. 31, 1912.
1,163,832.
Patented Dec. 14, 1915.
3 SHEETS—SHEET 2
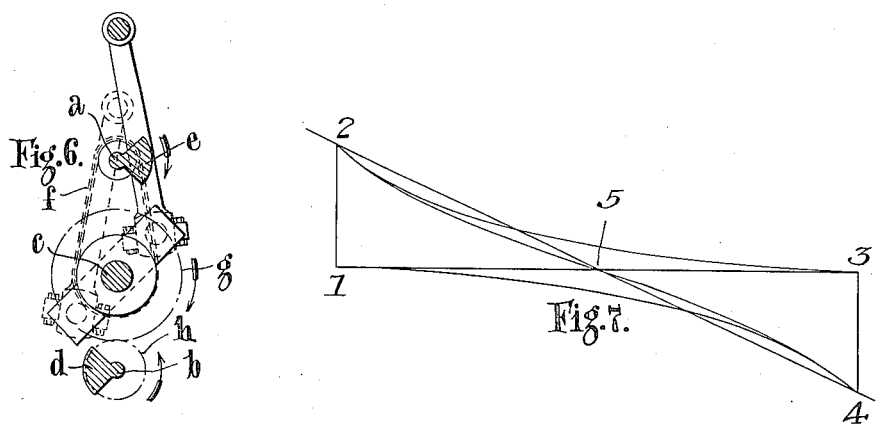
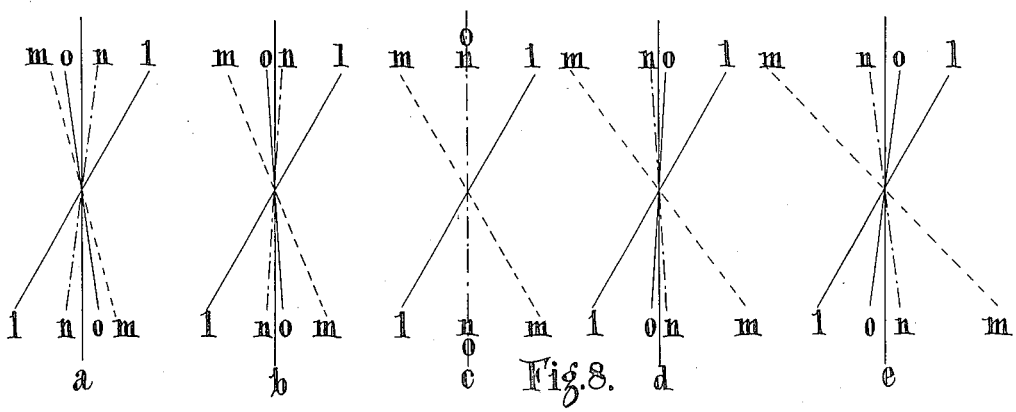
Witnesses.
H. L. Alden
R. E. Onsand
Inventor.
Frederick William Lanchester
by Spear, Middleton, Donaldson & Spear
Attorney.

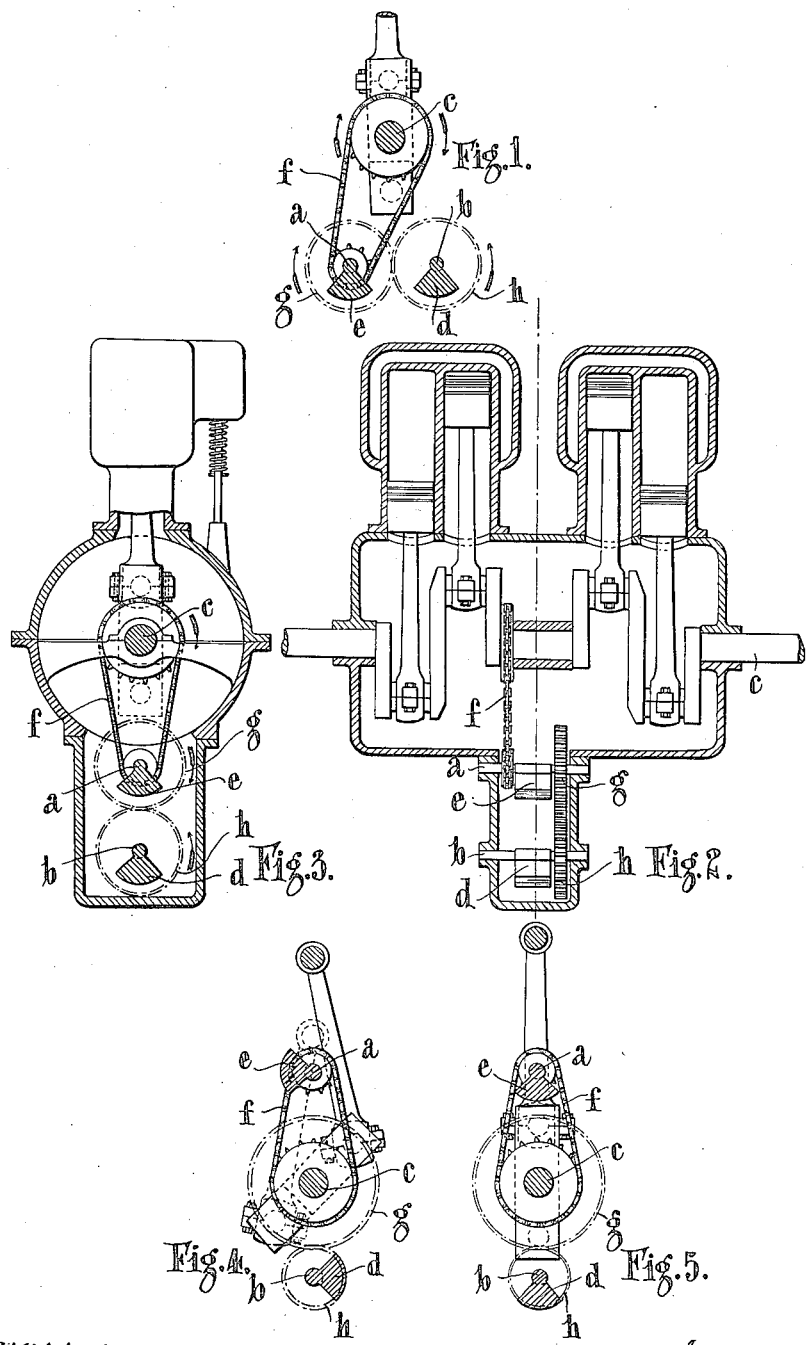

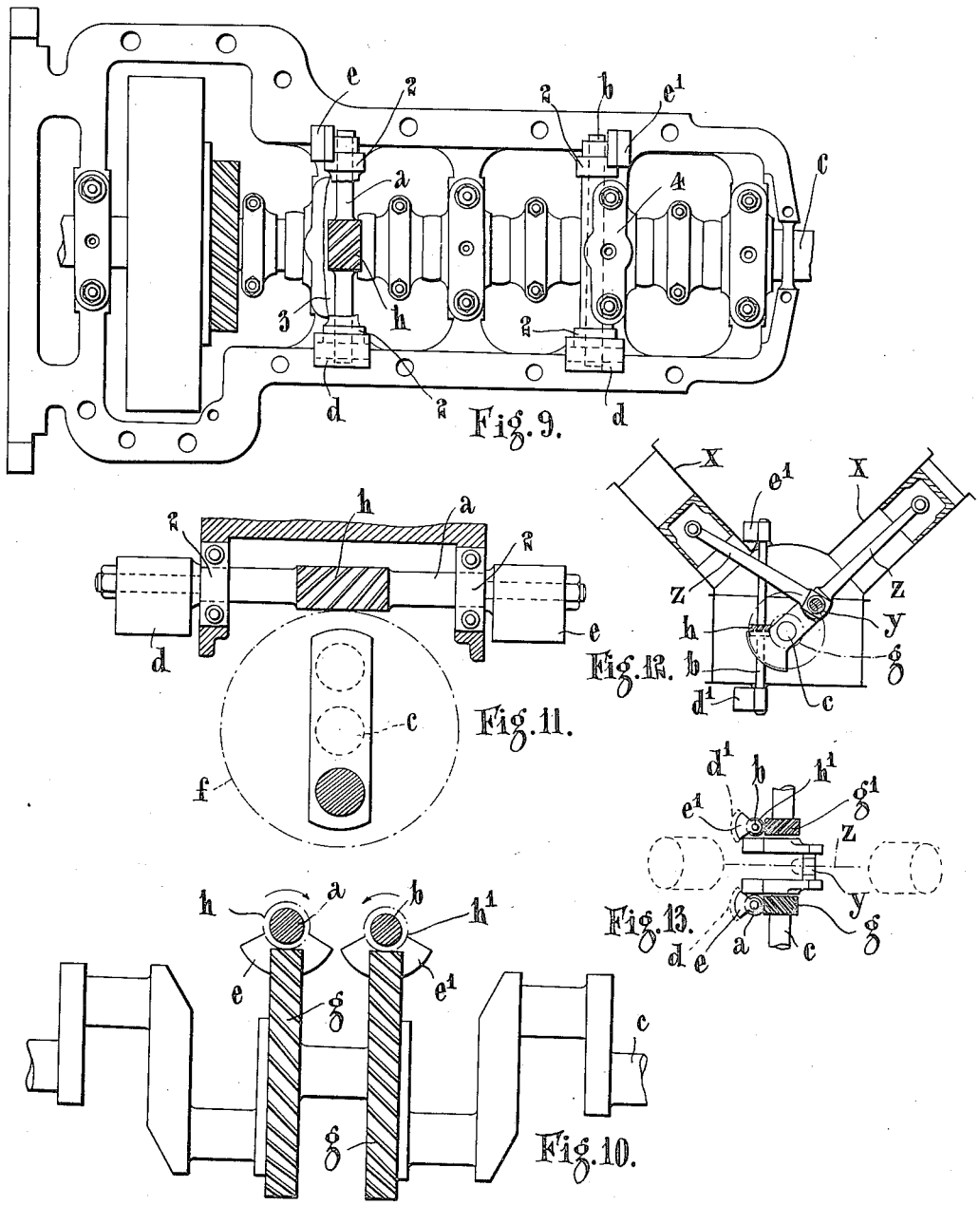

UNITED STATES PATENT OFFICE.

FREDERICK WILLIAM LANCHESTER, OF EDGBASTON, BIRMINGHAM, ENGLAND.

BALANCING MEANS FOR RECIPROCATING ENGINES.

1,163,832.　　　　　　　　Specification of Letters Patent.　　Patented Dec. 14, 1915.

Application filed October 31, 1912.　Serial No. 728,881.

*To all whom it may concern:*

Be it known that I, FREDERICK WILLIAM LANCHESTER, a subject of the King of Great Britain and Ireland, and residing at Edgbaston, Birmingham, in the county of Warwick, England, have invented certain new and useful Improvements Relating to the Balancing Means for Reciprocating Engines, of which the following is a specification.

The present invention relates to improvements in the balancing of reciprocating engines and refers more particularly to an improved method and means of eliminating vibration in reciprocating engines, more especially those "secondary" vibrations common to two and four cylinder internal combustion motors as ordinarily constructed.

The present invention consists in brief in the provision of pairs of rotating "bob-weights" having twice the periodicity of the piston or crank shaft motion at such points in the engine and so timed as to phase as to neutralize the forces to which the secondary vibrations aforesaid are due.

The present invention consists in brief in the provision, in a reciprocating engine, of mechanism comprising in effect two pairs of oppositely rotating masses having twice the periodicity of the main piston movement whose resultant lines of motion are parallel to the cylinder axis and symmetrically disposed on either side of the crank shaft, the phase of motion being so regulated or adjusted as to substantially neutralize (1) the linear vibration due to the connecting rod angularity, (2) the rocking moment about the longitudinal axis due to the alternations of torque due to piston inertia.

The present invention further consists in the provision of pairs of rotating bob-weights having twice the periodicity of the main piston motion, that is to say, making two rotations to each reciprocation made by the piston, arranged in the center plane of the engine or in effect otherwise symmetrically disposed of such stroke and mass as to neutralize the error of motion of the piston or pistons and other reciprocating masses due to the angularity of the connecting rod or rods.

The present invention further consists in the provision of reverse rotating bob-weights having twice the periodicity of the main piston motion arranged to neutralize simultaneously the forces due to the angularity of the rods aforesaid and the alternating rocking moment about the axis of rotation due to the torque variations consequent upon the changes of the kinetic energy of the pistons of the engine.

The present invention further consists in the provision, in a reciprocating engine, of two symmetrically disposed reverse rotating shafts, at right angles both to the crank shaft and cylinder axes, driven at twice engine speed by worm, screw, or other suitable gear and furnished with pairs of rotating balance weights whose resultant motion neutralizes the secondary vibrations aforesaid.

Referring to the accompanying drawings, Figure 1 is a cross-sectional view showing a form of the present invention in which the shafts carrying the bob-weights are side by side and beneath the crankshaft; Fig. 2 is a longitudinal section of a modification in which the bob-weight shafts are both below the crankshaft and one above the other; Fig. 3 is a cross-sectional view of Fig. 2; Figs. 4 and 5 show in two positions a further modification in which the bob-weight shafts are positioned one above and one below the crankshaft; Fig. 6 shows a modification in which the bob-weights are arranged to balance the rocking forces due to compression; Fig. 7 is a diagram showing how the rocking forces due to compression may be approximately balanced at a particular speed by means of a reciprocating weight; Fig. 8 is an explanatory diagram showing how the "secondary" forces and rocking forces due to compression may be caused to balance at a given speed; Fig. 9 shows a view from below of a four-cylinder engine embodying a modification of the present invention; Fig. 10 shows an alternative arrangement of the shafts carrying the rotating bob-weights; Fig. 11 is a part sectional view of Fig. 10; Fig. 12 is a part sectional elevation showing the application of the present invention to an engine of the V type; Fig. 13 is a plan of Fig. 12.

In one mode of carrying the present invention into effect, as shown in Fig. 1, as applied to a four-cylinder engine of ordinary construction for the neutralization of the "secondary" vibratory forces due to the angularity of the connecting rods, two parallel shafts $a$ $b$ are fitted parallel to the crankshaft $c$ and geared to run in opposite directions at twice the crankshaft speed, for instance, by means of a chain $f$ and gear wheels $g$ $h$. These are provided with rotating bob-weights $e$ $d$ in or about the plane of symmetry of the engine, whose motions neutralize each other in respect of lateral motion, but combine in respect of their vertical component to give in effect a simple harmonic vertical motion whose phase is arranged to be contrary to that of the error of motion of the pistons; that is to say, when the pistons are at the top and bottom positions, the bob-weights $e$ $d$ are always at their lowest positions.

In the modification shown in Figs. 2 and 3 the shafts $a$ and $b$ carrying the rotating bob-weights $e$ and $d$ are situated one above the other and both beneath the crankshaft $c$ and approximately beneath the main center bearing of the crankshaft, $i.\ e.$, in the plane of symmetry of the engine. The upper shaft $a$ is driven at twice crankshaft speed by chain gearing $f$ and the lower shaft $b$ is driven by equal gear wheels $g$ and $h$ from the shaft $a$.

In another mode of carrying the present invention into effect, as shown in Figs. 4 and 5, as applied to a four-cylinder engine of the ordinary vertical type to neutralize the axial rocking moment as well as the forces due to the angularity of the connecting rods, the two reverse rotating parts or bob-weights $e$ $d$ are arranged vertically over one another and their axes of rotation $a$ $b$ are parallel to the crankshaft $c$ and separated by a sufficient distance to neutralize the axial rocking moment under the normal conditions of running (in an engine of ordinary proportions) by a distance about equal to the length of the connecting rod.

The shafts $a$ and $b$ of the two rotating parts are conveniently arranged, the one above and the other below the center main bearing of the crankshaft $c$, the upper one $a$ being conveniently driven by a chain $f$ and the lower one $b$ by spur gearing $g$ $h$ from the crankshaft $c$ itself. The bob-weights $e$ $d$ are arranged to be in their respective uppermost and lowermost positions simultaneously, as shown in Fig. 5, so that their vertical components of motion synchronize and combine to correct for the piston displacement due to connecting rod angularity. Their horizontal components of motion are opposite and give rise to an alternating couple which may be proportioned to neutralize the axial rocking moment aforesaid.

In the arrangements shown in Figs. 2, 3, 4 and 5 the bob-weight shafts may be conveniently actuated from the crankshaft by a vertical second motion shaft and skew gear.

In the case of a four-cylinder internal combustion engine, it is in some cases desirable to employ the present invention only in so far as applies to the neutralization of the vibratory forces directly due to the angularity of the connecting rods, as in the example above described.

In a four-cylinder petrol engine as ordinarily constructed and at ordinary running speeds, the rocking moment is more than neutralized by the intermittent torque due to the compression, and there is a critical speed at which the neutralizing action of the variable compression torque almost exactly balances the rocking moment.

Fig. 7 shows how the resultant of the rocking torque due to compression approximates to the effect produced by a weight reciprocating in a straight line. In Fig. 7 the line 1, 2 may be taken to represent the compression pressure in cylinders Nos. 1 and 4 of the engine, and the line 3, 4 the compression pressures in cylinders Nos. 2 and 3, and it will be seen that the resultant of these pressures is the curved line 2, 5, 4 which, without very great error, may be replaced by a straight line, and it is thus clear that a reciprocating weight can be made to balance the compression forces. It will be clear, therefore, that two oppositely rotating weights may be used for the same purpose.

Fig. 6 shows the application of this portion of the invention to a four-cylinder engine, the bob-weights being arranged so that at a given speed the compression torque and the "secondary" forces are all balanced at a certain critical speed.

In Fig. 8 the line $l$ $l$ represents the line of reciprocation of a weight equivalent to the variable torque due to compression, and it will be seen that this line is constant irrespective of the engine speed. The diagrams $a$, $b$, $c$, $d$ and $e$ show how the "secondary" forces vary as the engine speed increases. In all the diagrams the line $m$ $m$ is the line corresponding to the reciprocation of a weight equivalent to the "secondary" forces produced by the reciprocating parts. The line $n$ $n$ shows the resultant of the compression forces and reciprocating forces, and it is this resultant which has to be counterbalanced by the use of balance weights. The line $o$ $o$ shows in each case how the balancing weights must be arranged to obtain a complete balance. It will be seen from the several diagrams that the correct position for the line $o$ $o$ varies with the speed of the engine. If the complete balance is required at speeds corresponding to the diagrams $a$ and $b$ the balance weights must be arranged so as to assist the forces due to reciprocation. At the speed represented by the diagram $c$ the forces of compression balance the forces due to reciprocation without the addition of any balance weight, while in the diagrams $d$ and $e$ at higher engine speeds the balance weights must be arranged to assist the compression forces.

It will be seen that it may be expedient in some cases to apply the invention to torque balancing in a negative sense, as the variable torque due to compression is, at high speeds, greater than the torque due to the reciprocating masses, and by the present invention it is possible to eliminate the resultant torque for any particular speed specified, and so, if in the case, for example, of a petrol engine applied to automobile work, the rocking moment should be found to synchronize with the chassis member vibration or the vibration of any other structural part of the vehicle, the present invention permits of the elimination of vibration at the particular speed at which the synchronous vibrations between the chassis member or other part of the vehicle and the engine would otherwise be experienced.

In an alternative mode of carrying the present invention into effect as applied to a four cylinder internal combustion motive power engine of the vertical type, as shown in Fig. 9, two horizontal transverse shafts, $a\ b$, are arranged supported in bearings 2 carried by the crank case casting or by two of the bearing caps 3, 4 and driven by right and left hand screw or worm gearing $g\ h$ $g'\ h'$ at twice the speed of revolution of the crank shaft $c$. The ends of the transverse shafts $a\ b$ are fitted with rotary balance weights $e\ d\ e'\ d'$, the horizontal components of whose motions are timed to neutralize (by virtue of the reverse rotation) while the vertical components combine to give a resultant equal to their sum. The positions of the revolving balance-weights are so timed as to give the necessary correction for the secondary vibrations that it is required to eliminate.

In the modification shown in Figs. 10 and 11, the transverse shafts carrying the rotating bob-weights are situated one on each side of the plane of symmetry of the engine and near the center bearing of the crank shaft, the bearings for the transverse shafts being conveniently formed in the crank case casting. In the case of engines of the V type, the bob-weights are only required to neutralize the first of the disturbances mentioned above, namely, the linear vibration due to the connecting rod angularity, and in the usual arrangement of this type with the cylinders above the crank shaft and at right angles to each other, the direction of this vibration is horizontal.

Figs. 12 and 13 illustrate diagrammatically the application of the present invention to engines of the V type. The cylinders $x\ x$ are inclined to one another at 90°. The connecting rods $z\ z$ work upon a common crank pin $y$ on the crank shaft $c$. Now as the disturbances which give rise to the linear vibration above mentioned act along the axes of the cylinders and as these axes intersect upon the crank shaft axis, it follows that the resulting linear vibration which has to be corrected acts in a horizontal plane containing the axis of the crank shaft. It is therefore necessary to so arrange the oppositely rotating balance weights that their combined resultant shall act in this horizontal plane containing the crank shaft. In order to effect this, vertical shafts $a$ and $b$ are provided rotating in bearings conveniently fixed upon the crank chamber. These shafts carry skew gears $h\ h'$ which mesh with gears $g\ g'$ upon the crank shaft, the relative sizes and slope of the teeth of the pairs of gears being such that the shafts $a\ b$ rotate at twice the speed of the crank shaft and in opposite directions to one another. Upon each end of each of the vertical shafts are secured bob-weights $e\ d\ e'\ d'$. Owing to the exigencies of design it may in some cases be inconvenient to position the bob-weights symmetrically upon the vertical shafts. This is the case in the drawing Fig. 12. In such case it is necessary that the rotating balance weight which is nearer to the plane in which the resultant horizontal force is to act shall be larger than the rotating balance weight which is more remote. This is indicated diagrammatically in Fig. 12, the balance weights $d$ and $d'$ being shown larger than the balance weights $e$ and $e'$.

At the speeds below this critical speed it may in some cases be expedient to apply the invention to torque balancing in a negative sense, as the variable torque due to compression is at such speeds greater than the torque due to the reciprocating masses.

By the present invention it is possible to eliminate the resultant torque for any particular speed specified, and so, if in the case, for instance, of a petrol engine applied to automobile work, the rocking moment should be found to synchronize with the chassis members or other structural part of the vehicle, the present invention permits of the elimination of vibration for the particular speed at which the synchronous vibrations would otherwise be experienced.

What I claim is—

1. In a reciprocating engine, means for preventing secondary vibrations, comprising in combination, a crank shaft, rotatably mounted masses, and means for rotating said masses in opposite directions at twice the speed of revolution of said crank shaft, as set forth.

2. In a reciprocating engine, means for preventing secondary vibrations, comprising in combination, a crank shaft, two rotatably mounted masses, mechanical inter-connections between said masses and said shaft for rotating said masses in opposite directions at twice the speed of revolution of said crank shaft, as set forth.

3. In a reciprocating engine, means for preventing secondary vibrations, comprising in combination, a crank shaft, shafts at right angles to said crank shaft, gearing between said crank shaft and said shafts adapted to rotate said shafts at twice crank shaft speed in opposite directions, and masses carried eccentrically on said shafts, as set forth.

4. In a reciprocating engine, means for preventing secondary vibrations, viz., linear vibration due to connecting rod angularity, comprising in combination, a crank shaft, rotatably mounted masses, and means for rotating said masses in opposite directions at twice the speed of revolution of said crank shaft, as set forth.

5. In a reciprocating engine, means for preventing secondary vibrations, viz., linear vibration due to connecting rod angularity, and also the rocking moment about the longitudinal axis due to alternations of torque due to piston inertia, comprising in combination, a crank shaft, rotatably mounted masses, and means for rotating said masses in opposite directions at twice the speed of revolution of said crank shaft, as set forth.

6. In a reciprocating engine, means for preventing secondary vibration, viz., linear vibration due to connecting rod angularity, and the resultant of variable torque due to piston inertia and to the compression torque at a given speed, comprising in combination, a crank shaft, rotatably mounted masses, and means for rotating said masses in opposite directions at twice the speed of revolution of said crank shaft, as set forth.

In testimony whereof, I affix my signature in presence of two witnesses.

FREDERICK WILLIAM LANCHESTER.

Witnesses:
P. A. OUTHWAITE,
J. PHILLIPS CRAWLEY.